US006332075B1

United States Patent
Verdonk (10) Patent No.: US 6,332,075 B1
(45) Date of Patent: Dec. 18, 2001

(54) USE OF DISTINCTIVE RINGING IN A WIRELESS COMMUNICATION SYSTEM TO INFORM A CALLED PARTY OF AN INCREASED BILLING RATE

(75) Inventor: Timothy C. Verdonk, Redmond, WA (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/280,261

(22) Filed: Mar. 29, 1999

Related U.S. Application Data

(63) Continuation-in-part of application No. 09/223,890, filed on Dec. 31, 1998.

(51) Int. Cl.[7] .................................................. H04M 11/00
(52) U.S. Cl. ........................ 455/408; 455/406; 455/445; 455/567; 379/373
(58) Field of Search ................................. 455/406, 407, 455/408, 411, 414, 415, 418, 421, 422, 425, 432, 433, 550, 560, 561, 567, 575, 456, 457, 445; 379/373, 88.26, 142, 112

(56) References Cited

U.S. PATENT DOCUMENTS

| 4,726,056 | * | 2/1988 | An et al. ................................. 379/115 |
| 5,090,501 | * | 2/1992 | Muppidi et al. ....................... 455/410 |
| 5,148,472 | * | 9/1992 | Freese et al. .......................... 455/408 |
| 5,315,637 | * | 5/1994 | Breeden et al. ....................... 455/435 |
| 5,327,480 | * | 7/1994 | Breeden ................................ 455/417 |
| 5,361,297 | * | 11/1994 | Ortiz et al. ............................ 379/130 |
| 5,369,684 | * | 11/1994 | Buhl et al. ............................ 455/432 |
| 5,559,860 | * | 9/1996 | Mizikovsky .......................... 455/456 |
| 5,835,573 | * | 11/1998 | Dee et al. ............................... 379/89 |
| 5,894,595 | * | 4/1999 | Foladare ................................ 455/414 |
| 5,923,741 | * | 7/1999 | Wright et al. ......................... 379/114 |
| 6,002,755 | * | 12/1999 | Krank et al. .......................... 379/130 |
| 6,018,652 | * | 1/2000 | Frager et al. ......................... 455/406 |
| 6,038,443 | * | 3/2000 | Luneau ................................. 455/415 |
| 6,148,193 | * | 11/2000 | Miska et al. .......................... 455/410 |
| 6,163,691 | * | 12/2000 | Buettner et al. ...................... 455/414 |
| 6,226,379 | * | 5/2001 | Swan et al. ........................... 379/373 |
| 6,243,572 | * | 6/2001 | Chow et al. .......................... 455/408 |
| 6,256,503 | * | 7/2001 | Stephens .............................. 455/456 |

* cited by examiner

Primary Examiner—Dwayne Bost
Assistant Examiner—Joy K. Contee
(74) Attorney, Agent, or Firm—Bruce Garlick; James Harrison (57) ABSTRACT

A wireless communication system determines whether an increased billing rate will be applied for an incoming call by comparing an Originating Rate Center ID for the call with a current location of a mobile unit. Based upon this determination, the wireless communication center provides a distinctive ringing alert to a serviced mobile unit when an increased billing rate will be applied. An increased billing rate may be applied when the mobile unit terminates a call outside of its Home Zone and/or outside of the Orginating rate Center of the call. The user of the mobile unit may then elect to receive the call based upon the knowledge that the call is a increased billing rate call or a regular billing rate call.

20 Claims, 5 Drawing Sheets

USE OF DISTINCTIVE RINGING IN A WIRELESS COMMUNICATION SYSTEM TO INFORM A CALLED PARTY OF AN INCREASED BILLING RATE

CROSS-REFERENCE TO RELATED APPLICATION

The present application is a continuation-in-part of, and claims priority pursuant to 35 U.S.C. Sec. 120 to U.S. application Ser. No. 09/223,890, filed Dec. 31, 1998, pending, which is hereby incorporated herein by reference in its entirety.

BACKGROUND

1. Technical Field

The present invention relates generally to wireless communication systems; and more particularly to a wireless communication system in which a distinctive ringing is employed to notify the user of a mobile unit of an increased billing rate that will be applied to an incoming call.

2. Related Art

Cellular wireless communication systems are generally known in the art to facilitate wireless communications within respective service coverage areas. Such wireless communication systems include a "network infrastructure" that facilitates the wireless communications with mobile units operating within a service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC) which also couples to the PSTN, the Internet and/or to other MSCs.

A wireless mobile unit operating within the service coverage area communicates with one or more of the base stations. The base stations route the communications to the MSC via a serving BSC. The MSC routes the communications to another subscribing wireless unit via a BSC/base station path (which may be the same BSC/base station path when the communications are with another subscribing unit serviced by the same base station) or via the PSTN/Internet/other network to a terminating destination.

Various operating standards have been developed to standardize wireless communications. The wireless communication operating standards include, for example, the Advanced Mobile Phone Service (AMPS) standards, the Global Standards for Mobile Communications (GSM), the Code Division Multiple Access (CDMA) Standards and the Time Division Multiple Access (TDMA) standards. A standard that is employed in North America for interconnectivity of MSCs is the IS-41 standard. These operating standards set forth the technical requirements that facilitate compatible operation between equipment of differing vendors.

With advances in the structure and operation of modern wireless communication systems, the mobility provided by such systems has also advanced. For example, the user of a mobile unit may roam within most areas in the United States and be supported by a local wireless communication system. In such roaming operation, the user may access the local wireless communication system simply by operating his or her mobile unit as he or she would within his or her own service area. The local wireless communication system will service the call from or to the mobile unit. Thus, mobility has become essentially seamless to the user.

When roaming, however, the fee structure is altered for most mobile unit users. Roaming fees are typically charged on a usage basis when a mobile unit is outside of its "Home Zone" or when a call is terminated to the mobile unit outside of its Originating Rate Center. Further, toll charges are typically assessed for incoming calls that are routed to a roaming mobile unit. However, even when a user is roaming, roaming and toll charges are not always applied. For example, when the call originates from a roamer access port or another mobile unit, toll charges are often not assessed. Further, when a mobile unit receives a call from another mobile unit, roaming charges are not always applied. When receiving an incoming call, the user does not know whether toll charges will be applied or whether roaming fees will apply. It is not until the user receives his or her bill that this information is learned. Thus, the user has no control over these charges and no particular knowledge of when these charges will be assessed.

Thus, there is a need in the art for a wireless communication system in which a user has control over charges that will be applied to his or her usage.

SUMMARY OF THE INVENTION

Thus, to overcome the shortcomings of the prior systems, among other shortcomings, a wireless communication system constructed according to the present invention determines whether an increased billing rate that includes roaming fees or toll charges will be applied to an incoming call terminated to a mobile unit and provides a distinctive ringing when an increased billing rate will be applied. Typically, these charges will be applied when the mobile unit is operating outside of its Home Zone or when the mobile unit terminates a call outside of its Originating Rate Center. The user of the mobile unit may then elect to receive the call based upon the knowledge that an increased billing rate will be applied.

A wireless communication system constructed according to the present invention includes an originating mobile switching center (MSC), a home location register (HLR), a serving MSC and supporting infrastructure for each MSC. Such supporting infrastructure includes a plurality of base station controllers (BSC) and a plurality of base stations. The base stations support wireless communications within respective cells to service mobile units operating in the cells.

In an operation according to the present invention, an originating mobile switching center determines an Originating Rate Center ID of an incoming call intended for a serviced mobile unit. The originating mobile switching center sends a locate request to a home location register that serves the mobile unit, the locate request including the Originating Rate Center ID. In response, the home location register forwards the Originating Rate Center ID to a serving mobile switching center in a route request.

The serving mobile switching center previously obtained the mobile unit's service profile, the service profile including the Home Zone ID and directives relating to how and when to provide distinctive ringing during call termination. One directive may require that a distinctive ringing (of a particular ring cadence) be applied when a call is terminated to the mobile unit outside of the Originating Rate Center. Another directive may require that a distinctive ringing (of a particular ring cadence) be applied when a call is terminated to the mobile unit outside of the Home Zone of the mobile unit.

In response to the route request, the serving mobile switching center pages the mobile unit and the mobile unit responds to the page. Based upon the location of the mobile unit within a respective service area, the serving mobile switching center determines whether an increased billing rate will be applied to the call. If an increased billing rate will be applied, the serving mobile switching center causes a distinctive ringing to be provided to the mobile unit. This distinctive ringing will be provided according to the directives stored in the visitor location register of the serving mobile switching center. If regular charges will be applied, a normal ringing is provided during the alert.

By specifying a particular ring cadence that will be provided to the mobile unit when a call at an increased billing rate will be terminated to the mobile unit, the mobile unit may roam to any serving mobile switching center and receive the same distinctive ringing for increased billing rate calls. Thus, the user will be presented with a consistent operation when an increased billing rate applies. Alternatively, a differing ring cadence may be applied for calls that are terminated outside of the Originating Rate Center as compared to calls that are terminated outside of the mobile unit's Home Zone. When differing billing rates apply thereto, the user of the mobile unit will be presented with multiple distinctive ring cadences for the differing increased billing calls.

Moreover, other aspects of the present invention will become apparent with further reference to the drawings and specification which follow.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE DRAWINGS

Figure 1:
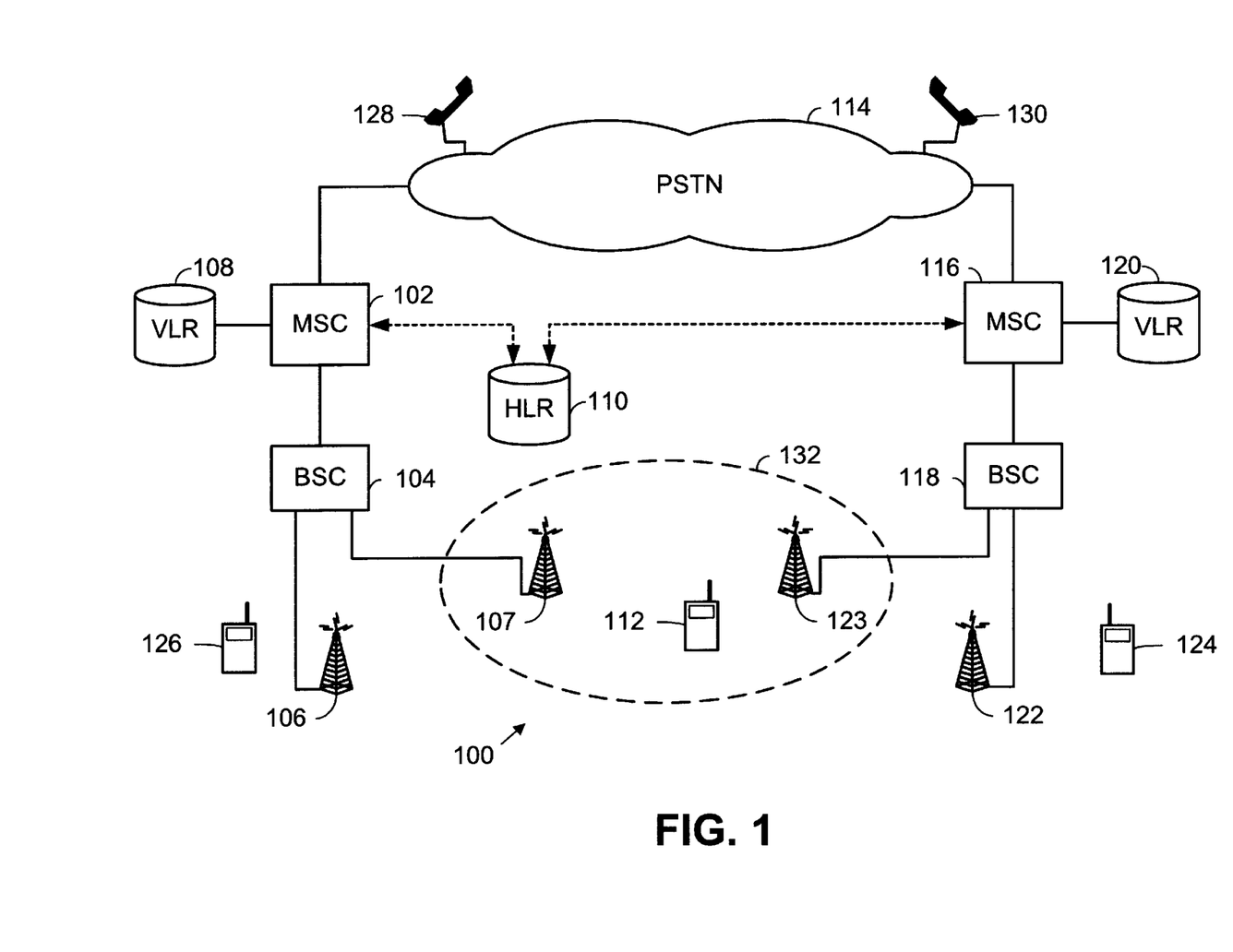
FIG. 1 is a system diagram illustrating generally the structure of a wireless communication system constructed according to the present invention.

FIG. 1 is a system diagram illustrating generally the structure of a wireless communication system constructed according to the present invention. The wireless communication system 100 includes mobile switching centers (MSCs) 102 and 116. Coupled to each MSC 102 and 116 is at least one base station controller (BSC). For example, BSC 104 is shown to be coupled to MSC 102 while BSC 118 is shown to be coupled to MSC 116. Finally, at least one base station couples to each BSC. As shown, base stations 106 and 107 couple to BSC 104 and provide wireless service within respective cell/sectors while base stations 122 and 123 couple to BSC 118 and provide wireless service within respective cell/sectors. The construction of cellular based wireless communication systems is generally known. Thus, the structure of such cellular wireless communication systems will not be discussed other than to explain the teachings of the present invention. However, in a typical cellular wireless communication system, a plurality of base stations couple to each BSC and a plurality of BSCs couple to each MSC.

Each of the MSCs 102 and 116 is serviced by a visitor location register (VLR), 108 and 120, respectively. Stored in the VLRs 108 and 120 are subscriber records for mobile units that are active in the service area of the MSCs 102 and 116, respectively. Each of the MSCs 102 and 116 also couples to a home location register (HLR) 110 which stores the subscriber information that is retrieved by the serving MSCs. The construction of VLRs and HLRs is also generally known and their operation will only be discussed herein as it applies to operation according to the present invention. A signaling path between the MSCs 102 and 116 and the HLR 110 is shown as a dotted line while the traffic paths between the MSCs 102 and 116 and the PSTN 114 are shown as solid lines. Communications between the MSCs 102 and 116 and the HLR 110 may be compliant with the IS-41 standard promulgated for North American intersystem operations.

When a mobile unit becomes active in a service area of an MSC 102 or 116, the service profile of the mobile unit is downloaded to a respective VLR 108 or 120. The service profile may be retrieved in IS-41 qualreq or regnot response messages. The service profile includes information such as the mobile unit's toll restrictions, the mobile unit's Electronic Serial Number (ESN), information required to authenticate the mobile unit and features supported by the mobile unit such as calling line ID, three way calling and other subscriber information for the mobile unit.

According to the present invention, the subscriber information also includes an indication of whether or not distinctive ringing is to be applied when the mobile terminates a call outside of the Originating Rate Center and an indication of which distinctive ringing cadence should be used in such case. The subscriber information also includes an indication of the Home Zone ID of the mobile unit and an indication of whether or not distinctive ringing is to be applied when the mobile terminates a call outside of its Home Zone and a distinctive ringing cadence to be applied in such case. Storing the ringing cadence in the subscriber information for increased billing rate calls ensures that the ringing cadence is consistent regardless of which MSC is serving the mobile.

Each of the MSCs 102 and 116 also couples to the public switched telephone network (PSTN) 114. Terminals 128 and 130 couple to the PSTN 114 and may access the wireless communication system 100 thereby. The MSCs 102 and 116 may couple to other communication networks, such as the Internet, as well.

A Home Zone 132 for mobile units 112, 126 and 124 is illustrated as ellipse 132. The Home Zone 132 is serviced by both MSC 102 and MSC 116. As is shown, base stations 107 and 123 provide service within the Home Zone 132. However, as is also shown, base stations 106 and 122 do not provide service within the Home Zone 132. Thus, without determining which base station currently provides service to the mobile units 112, 124 and 126, it cannot be determined whether the mobile units are operating within the Home Zone 132. Since an increased billing rate is applied for calls terminated to a mobile unit operating outside of its Home Zone 132, a determination of whether the mobile unit is operating outside of the Home Zone 132 must be determined upon call termination.

In an operation according to the present invention, a call is received by MSC 102 ("originating MSC") via the PSTN 114 from terminal 128 and intended for mobile unit 112. In such case, the originating MSC 102 sends a locate request to the HLR 110. Contained in this locate request is the Originating Rate Center ID. According to the present embodiment, the Originating Rate Center ID is the NPA-NXX for a telephone switch that originated the call. The NPA is the Numbering Plan Area for the telephone switch and the NXX is the Office Code for the telephone switch. The NPA-NXX therefore identifies the location at which the call originated, the Originating Rate Center ID.

The HLR 110 receives the locate request from the Originating MSC 102 and retrieves subscriber and current information for the mobile unit 124. The HLR 110 determines that MSC 116 ("serving MSC") currently services the mobile unit 112 and sends a route request to the serving MSC 116 which includes the NPA-NXX (Originating Rate Center). The serving MSC 116 then sets up the call with the originating MSC 102 and sends a page to the mobile unit 112 according to known paging techniques. The mobile unit 112 responds to the page via base station 123.

Determining that the mobile unit 112 responded via base station 123, the serving MSC 102 determines whether the call will be terminated outside of the Originating Rate Center and whether the call will be terminated outside of the Home Zone 132 of the mobile unit 112. Such determinations are made using the serving MSC's 116 Local Call Area Screening Tables, the NPA-NXX of the incoming call and the identity of the base station 123 at which the mobile unit 112 responded to the page. In the present example, the serving MSC 102 therefore determines that the call is terminated within the Originating Rate Center. Thus, the call is not an increased billing rate call and no distinctive ringing is applied.

In another example, a call is received by the serving MSC 116 for mobile unit 124. The mobile unit responds to a page at base station 122. In such case, the Originating Rate Center is also serviced by base station 122. Thus, based upon the Originating Rate Center, the call would not be an increased billing rate call. However, the mobile unit 124 is operating outside of its Home Zone 132. The serving mobile switching center 116 determines that the mobile unit 124 is operating outside of its Home Zone 132 based upon using the serving MSC's 116 Local Call Area Screening Tables, the Home Zone ID of the mobile unit 124 and the identity of the base station 122 at which the mobile unit 112 responded to the page. The subscriber information for the mobile unit 124 directs the serving MSC 116 to provide distinctive ringing for calls terminated to the mobile unit 124 outside of its Home Zone 132. Thus, the serving MSC 116 provides a distinctive ringing (of the ring cadence required by the subscriber information) to the mobile unit 124 to alert the mobile unit 124 of the increased billing rate call.

In another operation according to the present invention, a call from terminal 130 and intended for mobile unit 126 is received by originating MSC 102. The originating MSC 102 sends a locate request to the HLR 110 that includes the NPA-NXX for the incoming call. The HLR 110 determines that MSC 102 currently serves the mobile unit 124 and notifies the serving MSC 102. The serving MSC 102 pages the mobile unit 126 and the mobile unit 124 responds via base station 106.

The serving MSC 102, using its Local Call Area Screening Tables, the NPA-NXX of the incoming call, the Home Zone ID, the Originating Rate Center ID and the identity of the base station 106, determines that the call will be terminated outside of the Originating Rate Center and outside of the Home Zone 132 of the mobile unit 126. Thus, the serving MSC 102 determines that an increased billing rate will be applied. Because an increased billing rate will be applied, and based upon the subscriber profile, the serving MSC 102 provides a distinctive ringing to the mobile unit 126 to alert the user of the mobile unit 126 that the incoming call is an increased billing rate call. The user of the mobile unit 126 may then, based upon the distinctive ringing, decide whether to receive the call and pay the billing rate for the call. As contrasted to the previous example, because the mobile unit 126 was operating outside of its Home Zone 132, it was charged the toll.

In another operation, mobile unit 126 originates a call intended for mobile unit 124. While both mobile units 124 and 126 are roaming, the originating MSC 102 determines that the call originated at mobile unit 126 and assigns an Originating Rate Center ID accordingly. In the wireless communication system, mobile unit to mobile unit calls are all regular calls. The originating MSC 102 therefore sends a locate request to the HLR 110, the locate request including an Originating Rate Center ID that identifies the originating mobile unit 126 as another mobile unit supported by the system. In response, the HLR sends a route request to the serving MSC 116 that includes the Originating Rate Center ID. The serving MSC 116 pages the mobile unit 124 and then determines whether the call is an increased rate call. Because of the Originating Rate Center ID it has received, the serving MSC 116 determines that the call will be regular billing rate call and provides a corresponding ringing signal.

In still another example, the PSTN 114 employs intelligent routing to route calls to mobile units via their serving MSCs. In such case, the serving MSC receives the NPA-NXX and uses the NPA-NXX to determine whether the call is an increased billing rate call. Based upon this determination, operations previously described are performed and distinctive ringing is provided if the call is an increased billing rate call.

Figure 2:
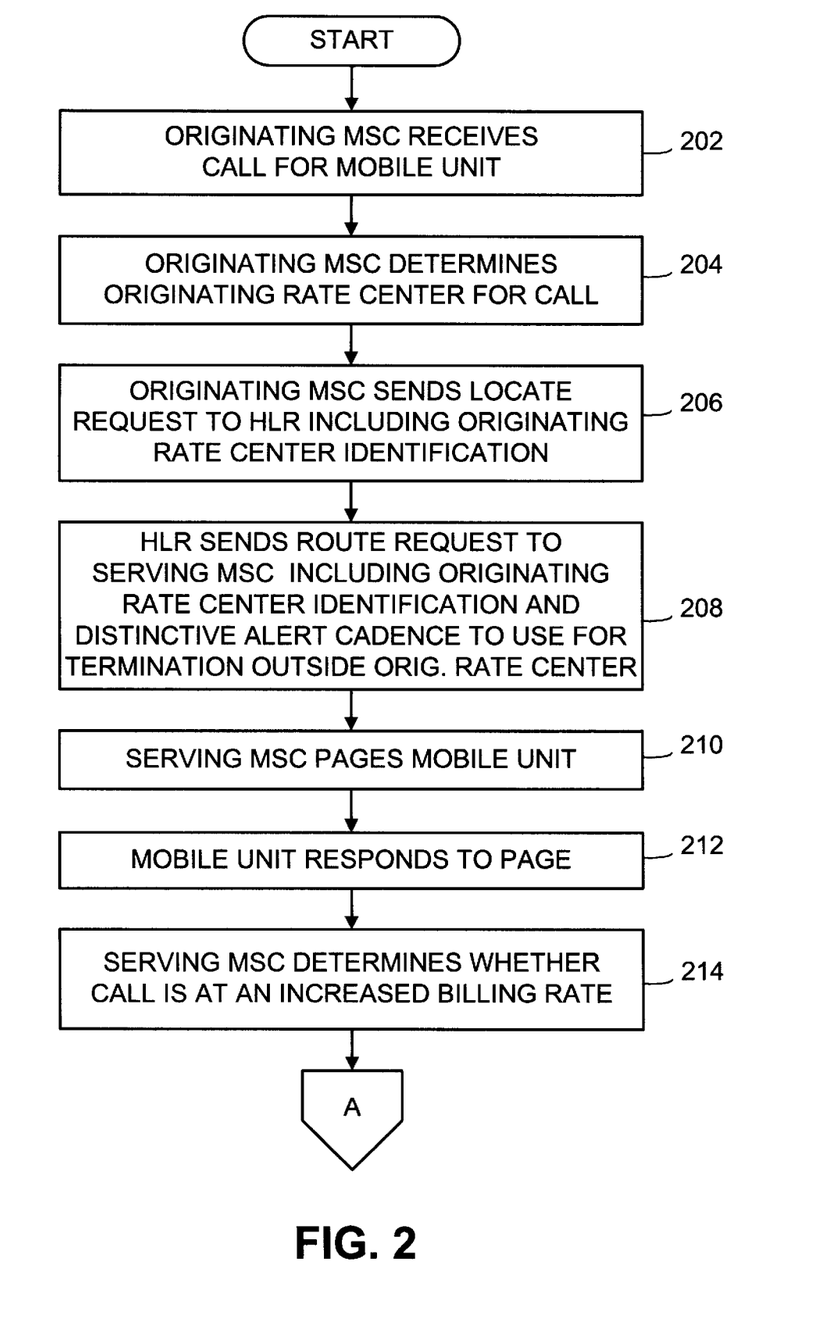
FIGS. 2 and 3 are logic diagrams illustrating operation of a wireless communication system according to the present invention in which the wireless communication system provides a distinctive alert signal to a mobile unit when attempting to terminate an increased billing rate call to the mobile unit.
Figure 3:
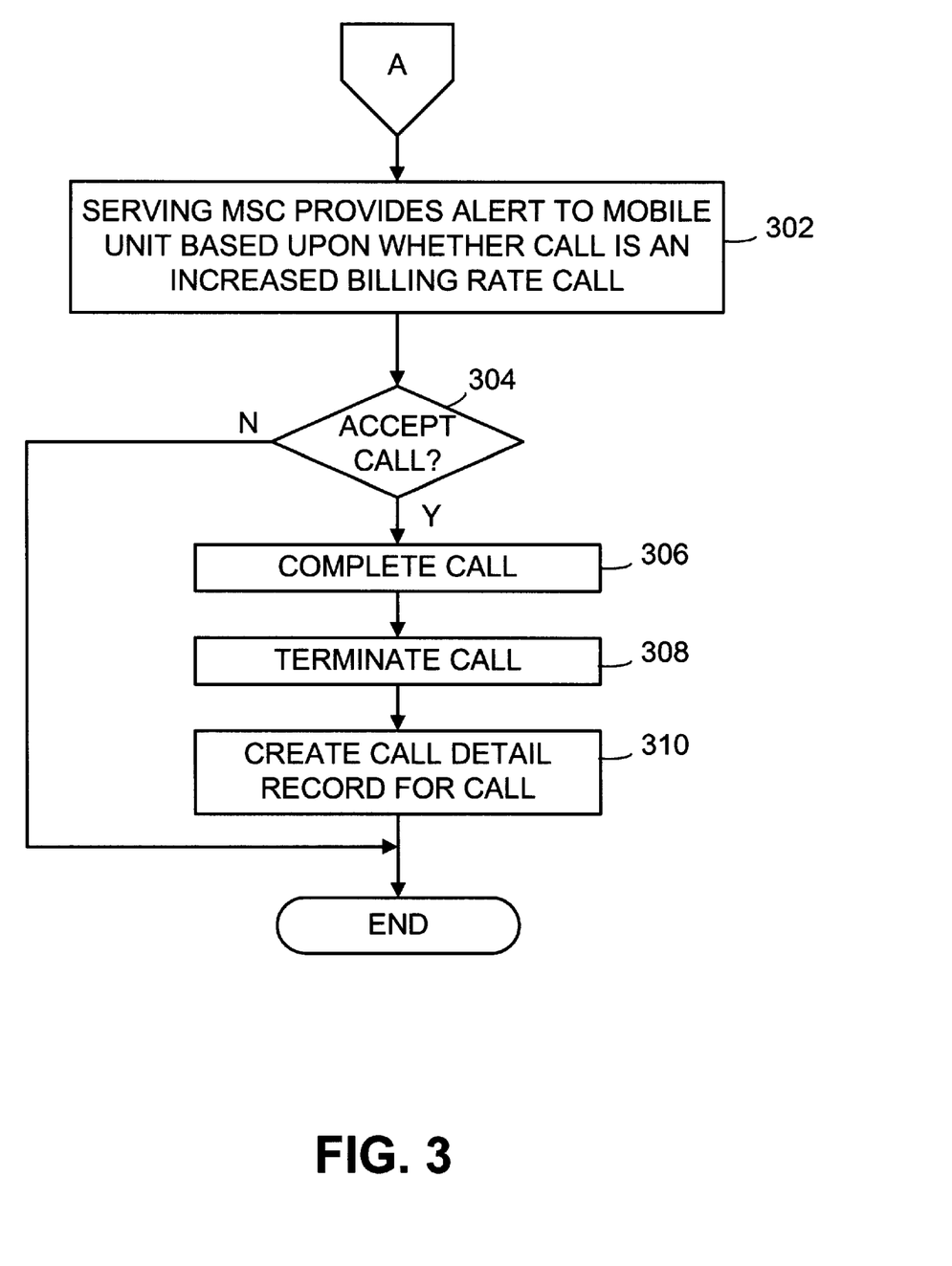

FIGS. 2 and 3 are logic diagrams illustrating operation of a wireless communication system according to the present invention in which the wireless communication system provides a distinctive alert signal to a mobile unit when attempting to terminate an increased billing rate call to the mobile unit. Referring now to FIG. 2, at step 202, an originating MSC receives a call intended for a mobile unit. At step 204, the originating MSC determines the Originating Rate Center ID for the call. As was described with reference to FIG. 1, the Originating Rate Center ID may take the form of an NPA-NXX. At step 206, the originating MSC sends a locate request to the HLR serving the mobile unit. In the locate request, the originating MSC includes the Originating Rate Center ID. Next, at step 208, the HLR sends a route request to a serving MSC including the Originating Rate Center ID. The route request may also specify the ring cadence to use when the mobile unit is located outside of the originating rate center. Such ring cadence may be specified as an alert code parameter in the route request. Then, at step 210, the serving MSC pages the mobile unit. At step 212, the mobile unit responds to the page.

Then, at step 214, the serving MSC determines whether the call is an increased billing rate call. As was previously described, such determination is made by the serving MSC using its Local Call Area Screening Tables, the NPA-NXX of the incoming call, the Home Zone ID for the mobile unit and the identity of the base station that received the page response from the mobile unit. As was previously described, two particular situations are described herein where an increased billing rate will be applied. A first situation is when the mobile unit terminates a call outside of the Originating Rate Center. A second situation is when the mobile unit terminates a call outside of its Home Zone. Of course, other operating scenarios may occur in which an increased billing rate will be applied, such operating scenarios also encompassed by the present invention. Operation proceeds from step 214 via off-page connector to step 302 of FIG. 3.

Referring now to FIG. 3, at step 302, the serving MSC provides an alert to the mobile unit based upon whether the call is an increased billing rate call or a regular billing rate call. When the call is a or a regular billing rate call, a normal ringing is provided. However, when the call is an increased billing rate call, a distinctive ringing is provide to the mobile unit based upon the subscriber profile for the mobile unit. Such distinctive ringing cadence may be specified in the alert code parameter as was described above. At step 304, the user of the mobile unit determines whether to receive the call. If the user chooses not to receive the call, operation ends. However, if the user chooses to receive the call, the call is completed at step 306 and serviced until it is terminated at step 308. Then, at step 310, a call detail record is created for the call by the serving MSC, the call detail recording including the increased billing rate, if applied. From step 310, operation ends.

Figure 4A:
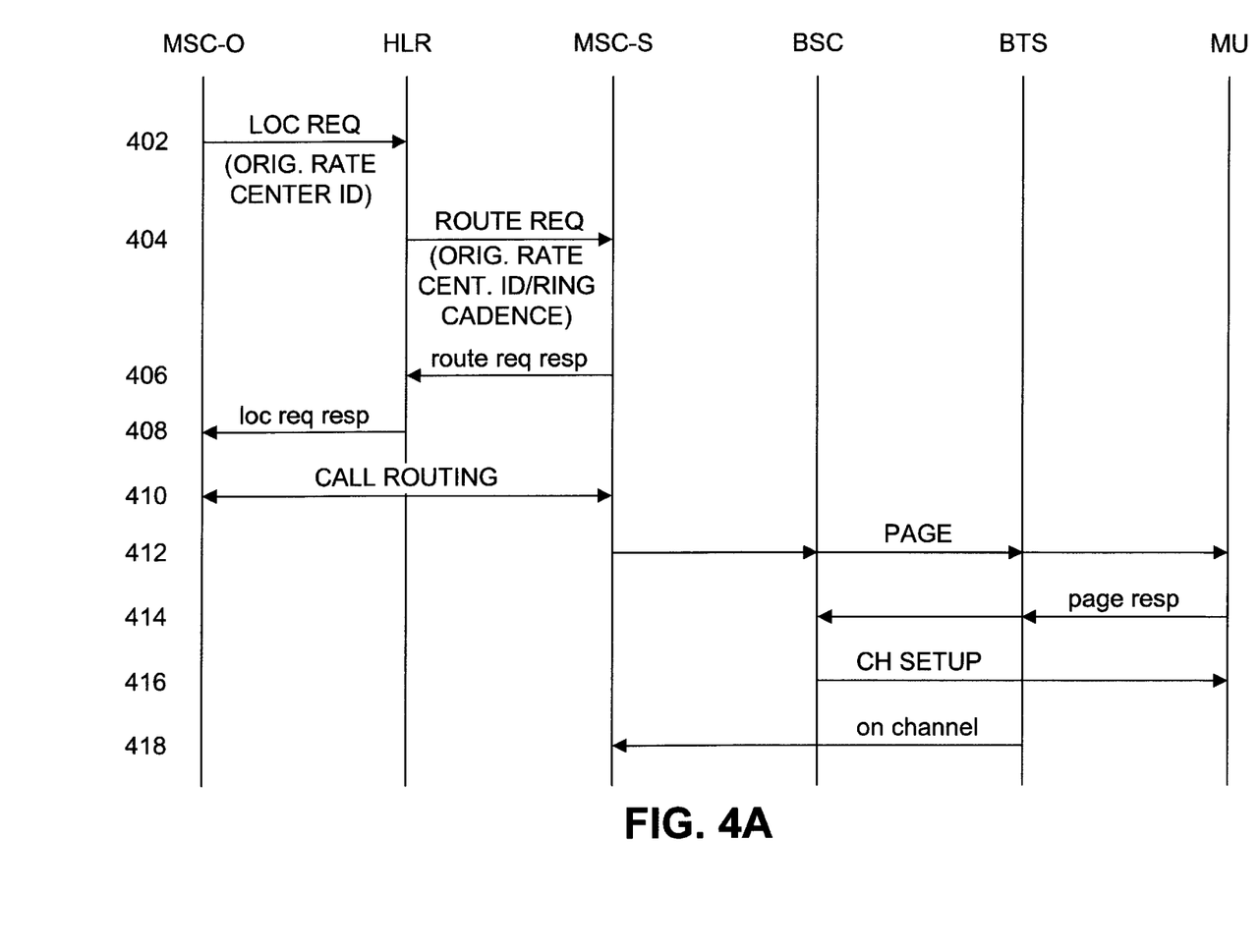
FIGS. 4A and 4B are message flow diagrams illustrating the flow of messages among an originating mobile switching center, a home location register, a serving mobile switching center, a base station controller, a base station and a mobile unit according to the present invention.
Figure 4B:
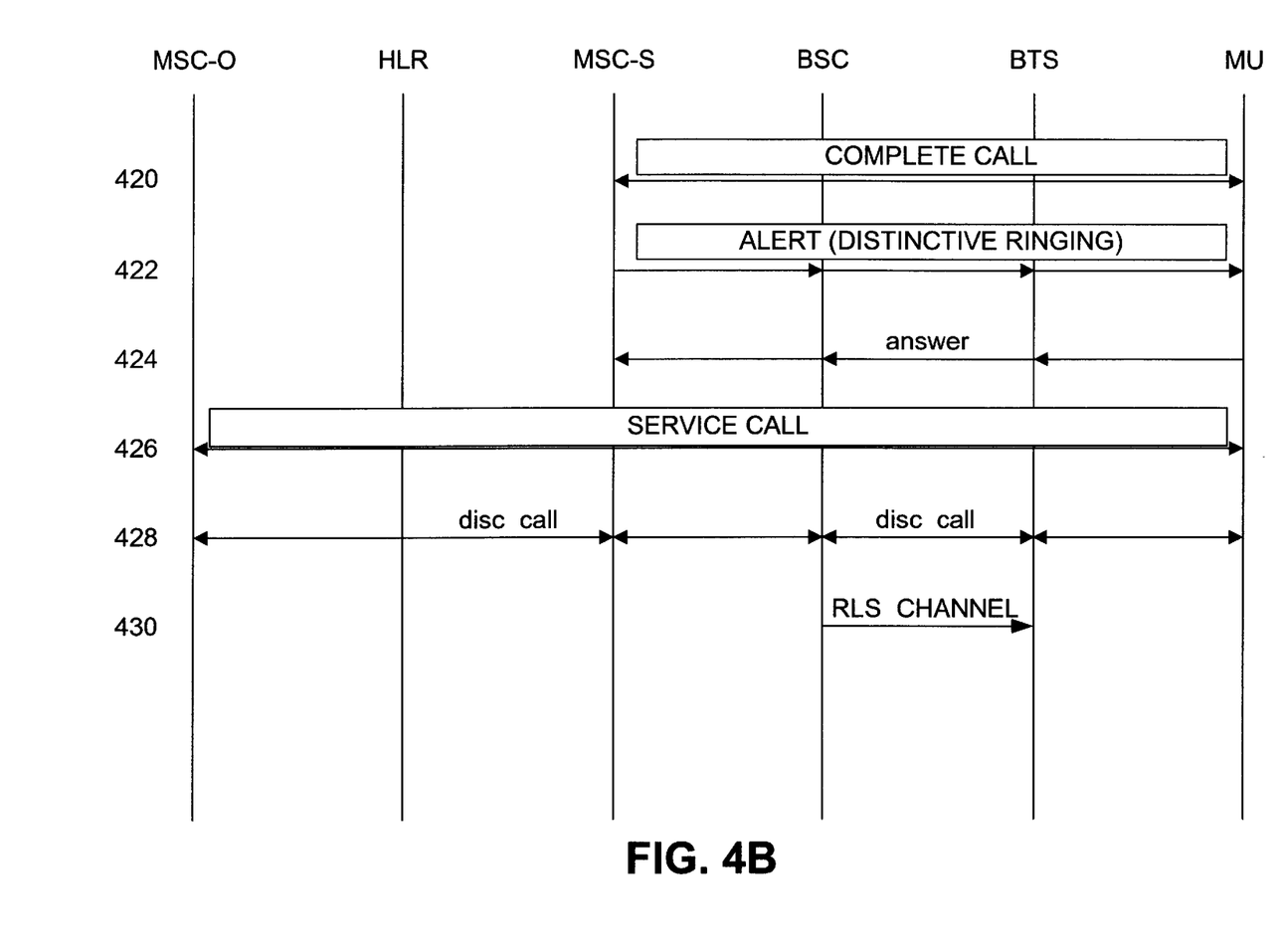

FIGS. 4A and 4B are message flow diagrams illustrating the flow of messages among an originating mobile switching center, a home location register, a serving mobile switching center, a base station (BTS) controller, a base station and a mobile unit according to the present invention. At 402, the originating MSC has received a request to terminate a call to a mobile unit based upon a call request and, in response, sends a locate request to a serving HLR. The locate request sent at 402 includes the Originating Rate Center ID.

The HLR then sends a route request to the serving MSC which includes the Originating Rate Center ID of the call at 404. The route request may also include an alert code parameter which specifies the alert cadence (ringing cadence) to use if the mobile unit to which the call is terminated is located outside of its originating rate center. As is generally known, the last known location of the mobile unit (serving MSC) is stored in the HLR and accessed in response to the locate request. In response, at 406, the serving MSC responds to the HLR with a route request response. The HLR then sends a locate request response to the originating MSC at 408, such locate request response identifying the serving MSC and including the Originating Rate Center ID.

At 410, the originating MSC and the serving MSC perform call routing to service the call. The serving MSC then sends a page to the mobile unit via at least one BSC and at least one base station transceiving subsystem (BTS) at 412 according to its paging operations. At 414, the mobile unit responds to the page with a page response. Such page response is relayed via a servicing BTS to a servicing BSC. The servicing BSC then coordinates the allocation and setup of a channel to the mobile unit at 416. Subsequently, the servicing BTS sends an on channel message to the serving MSC via the servicing BSC at 418.

Referring now to FIG. 4B, the serving MSC completes the call to the mobile unit at 420. Then, the serving MSC sends an alert to the mobile unit via the servicing BSC and servicing BTS at 422, such alert signal causing the mobile unit to ring. Based upon the Originating Rate Center ID of the call, the Home Zone of the mobile unit and the base station from which the mobile unit responded to the page, the serving MSC determines whether the call is an increased billing rate call or a regular billing rate call. Then, the serving base station sends a distinctive ring to the mobile unit if the call is an increased billing rate call or a regular ring if not. This distinctive ring (as well as the normal ring) may have been specified to the serving MSC in the previously discussed messages. If not, default normal and distinctive rings are employed.

The user of the mobile unit may answer the alert at 424 via the servicing BTS and the servicing BSC by accepting the call. Once these steps are complete, the call is serviced at 426 until either the mobile unit or the originating party disconnects. At 428, either the mobile unit or the originating party initiates disconnection of the call. Then, at step 430, the servicing BSC initiates the release of the channel at 430.

The invention disclosed herein is susceptible to various modifications and alternative forms. Specific embodiments therefor have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method of operating a wireless communication system, the method comprising:

receiving a call intended for a mobile unit serviced by the wireless communication system;

determining whether the call is an increased billing rate call or a regular billing rate call based upon a comparison between an Originating Rate Center ID for the call and a current location of the mobile unit;

completing the call to the mobile unit;

if the call is an increased billing rate call, providing a distinctive ringing alert signal to the mobile unit; and if the mobile unit accepts the call, servicing the call to completion.

2. The method of claim 1, wherein determining whether the call is an increased billing rate call or a regular billing rate call includes comparing the Originating Rate Center ID for the call and the identification of a base station serving the current location of the mobile unit.

3. The method of claim 2, wherein the Originating Rate Center ID comprises:

a numbering plan area; and an office code.

4. The method of claim 1, wherein determining whether the call is an increased billing rate call or a regular billing rate call is determined using a Local Call Area Screening Table contained in a mobile switching center servicing the call.

5. The method of claim 1, wherein:

a first ring cadence is provided to the mobile unit if the call is an increased billing rate call;

a second ring cadence is provided to the mobile unit if the call is a regular billing rate call; and the first ring cadence and the second ring cadence are stored in the mobile unit's subscriber profile and downloaded to a mobile switching center servicing the call.

6. The method of claim 1, wherein determining whether the call is an increased billing rate call or a regular rate call is also based upon a comparison between the current location of the mobile unit and a Home Zone of the mobile unit.

7. The method of claim 6, wherein determining whether the call is an increased billing rate call or a regular billing rate call is determined based upon an access of a Local Call Area Screening Table.

8. A wireless communication system comprising:

an originating mobile switching center and a respective supporting infrastructure, the originating mobile switching center receiving a call intended for a mobile unit serviced by the wireless communication system, the originating mobile switching center determining an Originating Rate Center ID for the call;

a home location register that stores location information for the mobile unit; and a serving mobile switching center and a respective supporting infrastructure;

the originating mobile switching center and the serving mobile switching center completing the call to the mobile unit;

the serving mobile switching center determining whether the call is an increased billing rate call based upon a comparison between the Originating Rate Center ID for the call and a current location of the mobile unit; and if the call is an increased billing rate call, the serving mobile switching center providing a distinctive ringing alert signal to the mobile unit to indicate that the call is an increased billing rate call.

9. The wireless communication system of claim 8, wherein the serving mobile switching center determines whether the call is an increased billing rate call or a regular billing rate call by comparing the Originating Rate Center ID for the call and the identification of a base station serving a current location of the mobile unit.

10. The wireless communication system of claim 9, wherein the Originating Rate Center ID comprises:

a numbering plan area; and an office code.

11. The wireless communication system of claim 10, wherein the serving mobile switching center determines whether the call is an increased billing rate call or a regular billing rate call based upon an access of a Local Call Area Screening Table.

12. The wireless communication system of claim 1, wherein the serving mobile switching center determines whether the call is an increased billing rate call or a regular billing rate call based upon an access of a Local Call Area Screening Table.

13. The wireless communication system of claim 8, wherein the serving mobile switching center determines whether the call is an increased billing rate call or a regular rate call also based upon a comparison between the current location of the mobile unit and a Home Zone of the mobile unit.

14. The wireless communication system of claim 13, wherein the mobile switching center determines whether the call is an increased billing rate call or a regular billing rate call based upon an access of a Local Call Area Screening Table.

15. The wireless communication system of claim 8, wherein when the Originating Rate Center ID for the call indicates that the call originates from another mobile unit, the call is charged at a regular billing rate.

16. The wireless communication system of claim 8, further comprising a visitor location register coupled to the serving mobile switching center that stores subscriber information for the mobile unit.

17. The wireless communication system of claim 16, wherein the subscriber information identifies a Home Zone ID for the mobile unit.

18. The wireless communication system of claim 16, wherein the subscriber information indicates whether a distinctive ringing alert should be applied for increased billing rate calls.

19. The wireless communication system of claim 16, wherein the subscriber information indicates a ringing cadence to be applied for increased billing rate calls.

20. The wireless communication system of claim 19, wherein the subscriber information indicates a ringing cadence to be applied for regular billing rate calls.

* * * * *